(12) United States Patent
Weiss et al.

(10) Patent No.: US 6,493,855 B1
(45) Date of Patent: Dec. 10, 2002

(54) FLEXIBLE CACHE ARCHITECTURE USING MODULAR ARRAYS

(75) Inventors: Donald R Weiss, Ft Collins, CO (US); Samuel D Naffziger, Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/507,498

(22) Filed: Feb. 18, 2000

(51) Int. Cl.$^7$ .............................................. G06F 17/50
(52) U.S. Cl. ............................................. 716/10; 716/8
(58) Field of Search ....................... 716/1–14; 714/710; 365/230, 200

(56) References Cited

U.S. PATENT DOCUMENTS

| | | | | |
|---|---|---|---|---|
| 4,918,614 A | * | 4/1990 | Modarres et al. | 716/14 |
| 5,386,387 A | * | 1/1995 | Tanizaki | 365/200 |
| 5,701,270 A | * | 12/1997 | Mohan Rao | 365/230 |
| 5,812,418 A | * | 9/1998 | Lattimore et al. | 716/8 |
| 5,883,814 A | * | 3/1999 | Luk et al. | 716/2 |
| 5,943,285 A | * | 8/1999 | Kohno | 365/230 |
| 6,018,482 A | * | 1/2000 | Fujita | 365/200 |
| 6,021,512 A | * | 2/2000 | Lattimore et al. | 714/710 |
| 6,144,577 A | * | 11/2000 | Hidaka | 365/63 |
| 6,237,130 B1 | * | 5/2001 | Soman et al. | 716/10 |

\* cited by examiner

*Primary Examiner*—Vuthe Siek
*Assistant Examiner*—Sun James Lin

(57) ABSTRACT

A system and method which implement a memory component of an integrated circuit as multiple, relatively small sub-arrays of memory to enable great flexibility in organizing memory within the integrated circuit are provided. In a preferred embodiment, the memory component of an integrated circuit is implemented as multiple, relatively small sub-arrays of memory, which enable a designer great flexibility in arranging such sub-arrays within an integrated circuit. Also, in a preferred embodiment, the memory component of an integrated circuit is implemented as multiple memory sub-arrays that are each independent. For example, in a preferred embodiment, each memory sub-array comprises its own decode circuitry for decoding memory addresses that are being requested to be accessed by an instruction, and each memory sub-array comprises its own I/O circuitry. In one implementation of a preferred embodiment, each of the independent memory sub-arrays implemented in an integrated circuit comprises no more than approximately five percent of the total memory implemented on the integrated circuit. In another implementation, each of the independent memory sub-arrays on an integrated circuit is no larger than approximately the average size of other non-memory components implemented on the integrated circuit. Additionally, in further implementation, the memory component of an integrated circuit comprises at least a 20 independent memory sub-arrays. Therefore, in a preferred embodiment, each independent sub-array is relatively small in size to enable great flexibility in organizing the memory on an integrated circuit. Furthermore, because each sub-array is independent, greater flexibility is available in repairing defects through redundancy.

18 Claims, 7 Drawing Sheets

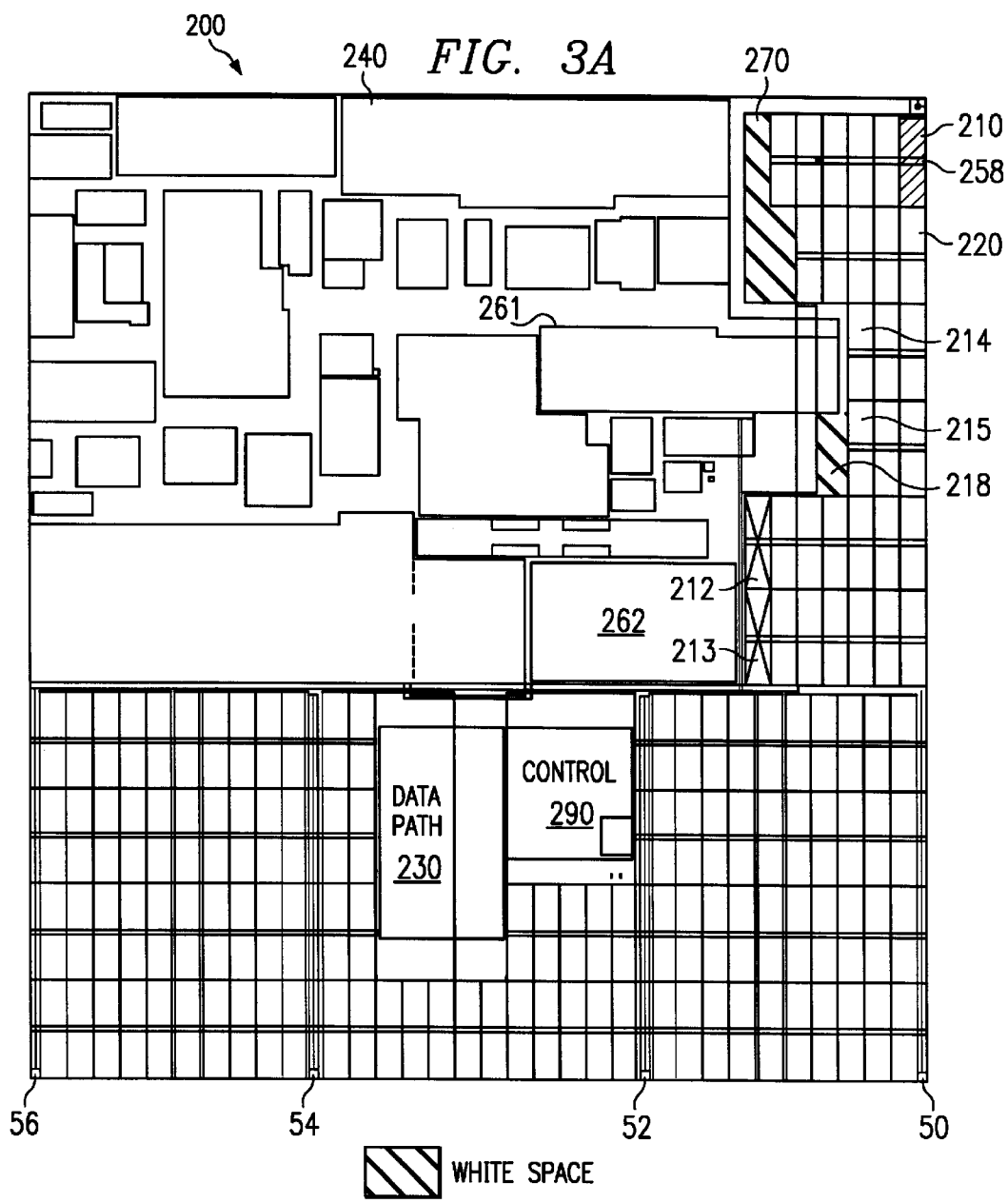

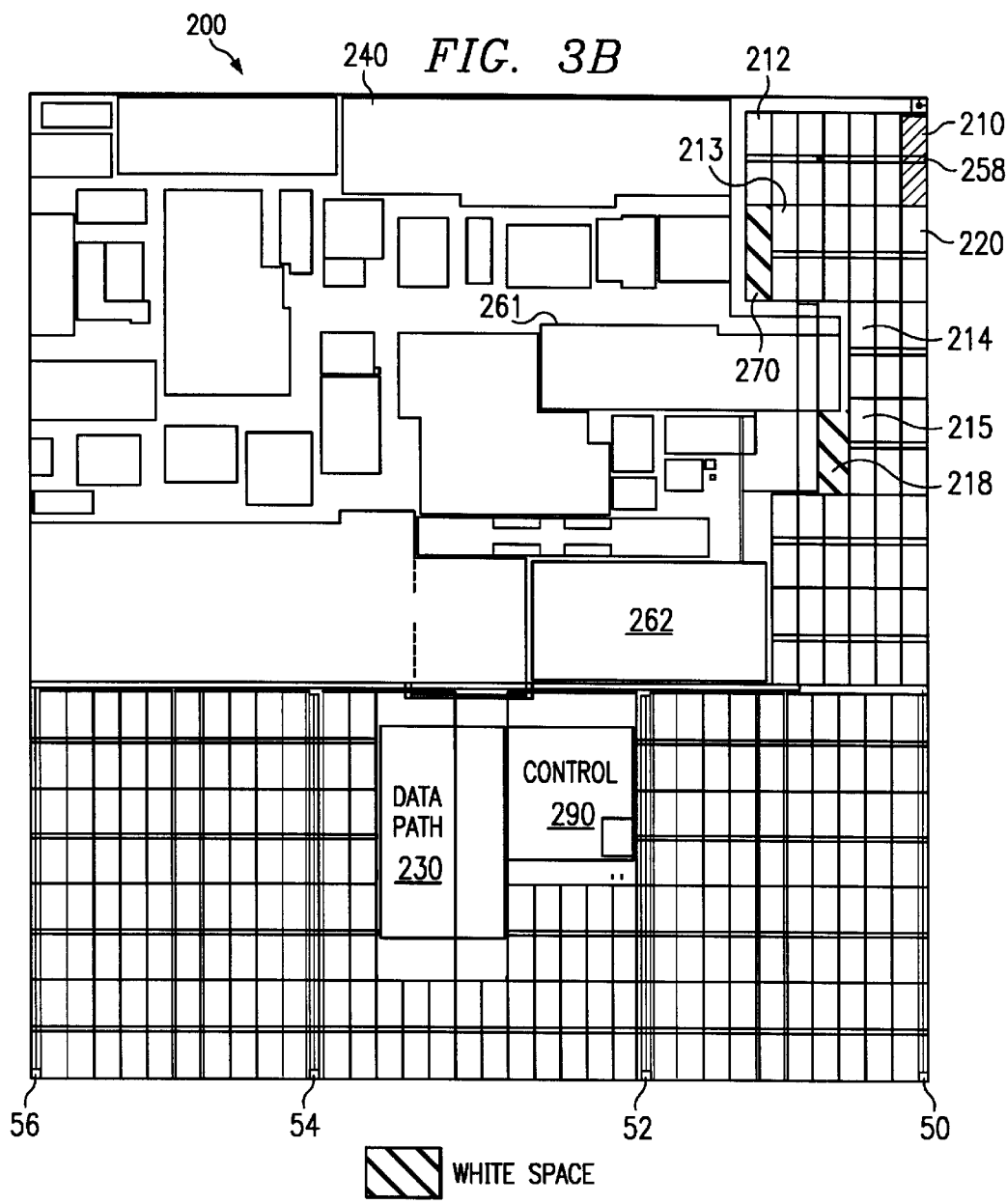

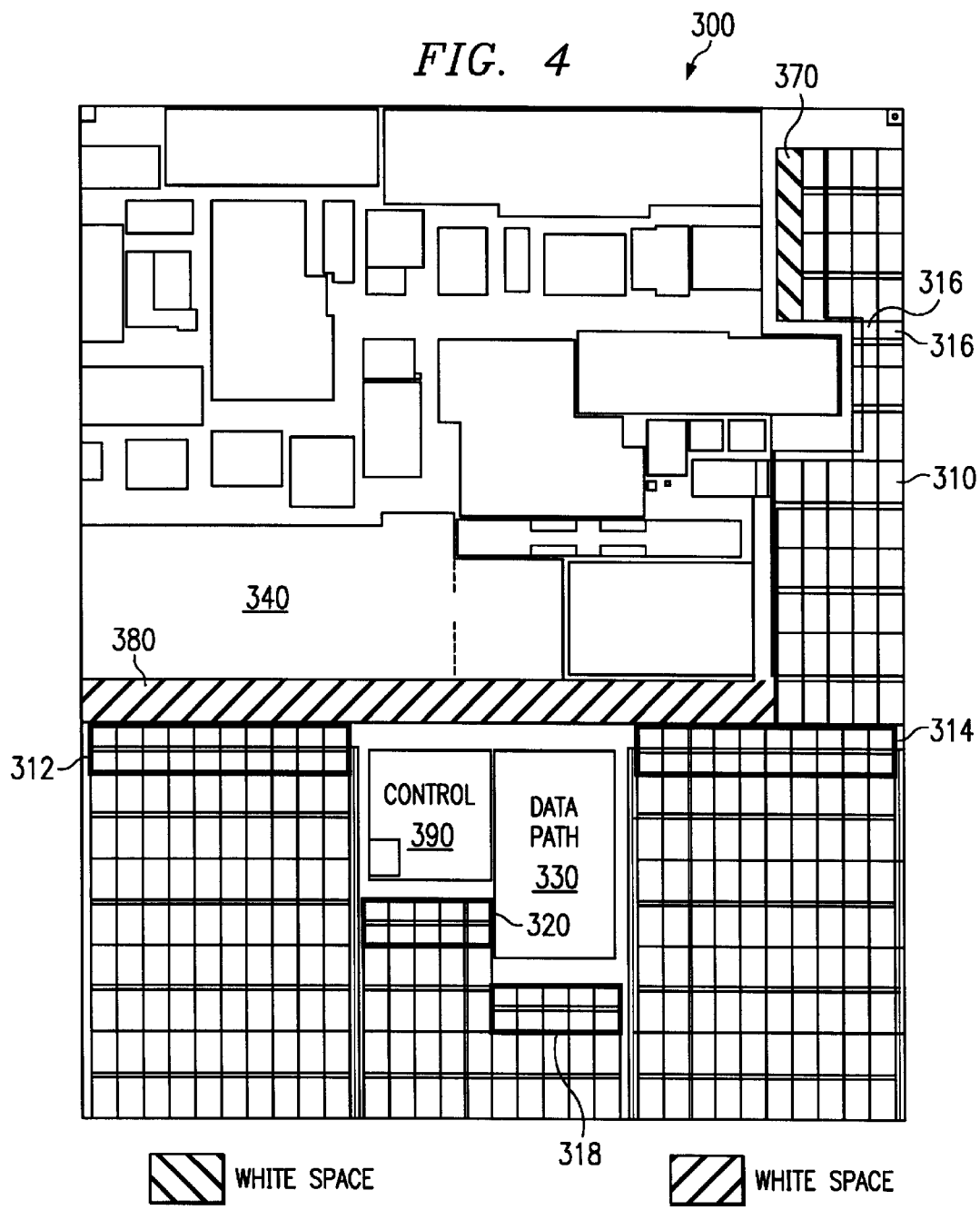

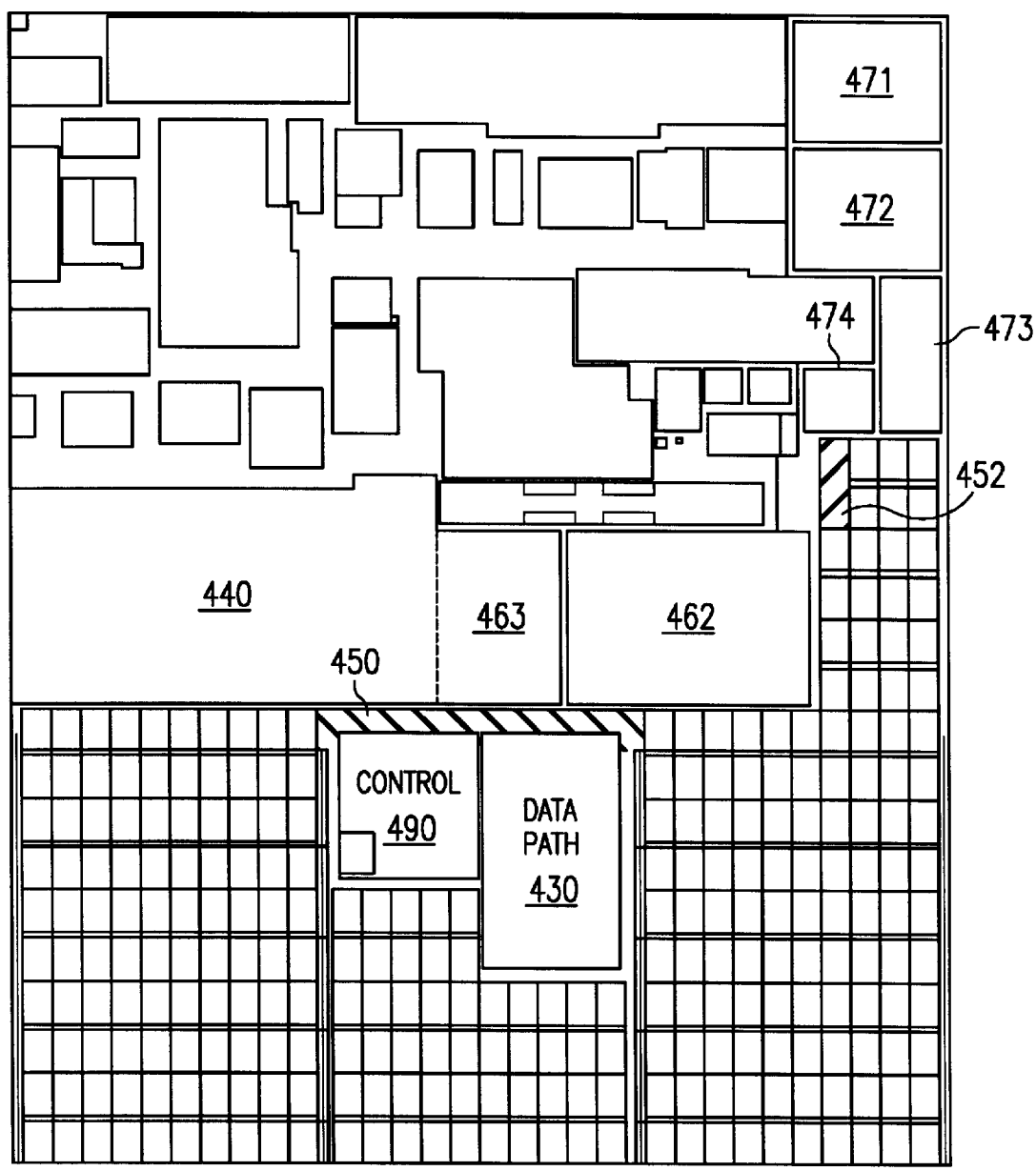

FLEXIBLE CACHE ARCHITECTURE USING MODULAR ARRAYS

TECHNICAL FIELD

This invention relates in general to memory architecture, and in particular to a flexible memory architecture implementation that can be easily adapted in response to compositional changes in the die of a chip.

BACKGROUND

Computer systems may employ a multi-level hierarchy of memory, with relatively fast, expensive but limited-capacity memory at the highest level of the hierarchy and proceeding to relatively slower, lower cost but higher-capacity memory at the lowest level of the hierarchy. The hierarchy may include a relatively small, fast memory called a cache, either physically integrated within a processor or mounted physically close to the processor for speed. The computer system may employ separate instruction caches ("I-caches") and data caches ("D-caches"). In addition, the computer system may use multiple levels of caches. The use of a cache is generally transparent to a computer program at the instruction level and can thus be added to a computer architecture without changing the instruction set or requiring modification to existing programs.

Turning to FIG. 1, an integrated circuit (chip) design of the prior art for a microprocessor is shown. As shown in FIG. 1, the design for chip 100 includes a non-memory block, shown as CPU core 40, which may include such components as an ALU for integer execution, a floating point execution unit, and lower level caches (e.g., level 1 cache), as well as other various components. Therefore, as used herein a non-memory block may refer to a non-memory portion of an integrated circuit, such as the CPU core of a microprocessor chip. Furthermore, such a non-memory block may comprise several smaller, non-memory components therein, such as an ALU, floating point execution unit, and other non-memory components of a microprocessor chip. As processor speeds increase and greater performance is required for processors, it becomes increasingly important for larger caches to be implemented for a processor. As described above, cache memory is typically capable of being accessed by a processor very quickly. Thus, the more data contained in cache, the more instructions a processor can satisfy quickly by accessing the fast cache. That is, generally, the larger the cache implemented for a processor, the better the performance of such processor. Therefore, processor chips of the prior art commonly implement large cache structures. For example, as shown in FIG. 1, a higher level memory (e.g., level 2 cache) is implemented on the processor chip in memory blocks 10, 20, and 30. It is common in prior art designs for such additional memory to consume half (or even more) of the surface area of the die for a chip.

In memory architecture (or memory organization) of the prior art, memory blocks, such as memory blocks 10, 20, and 30, are typically implemented in relatively large, rectangular (or square) blocks. For example, memory blocks are commonly implemented having 256 by 256 memory cells, 512 by 512 memory cells, or 1024 by 1024 memory cells. Such memory blocks of the prior art are typically limited to being rectangular blocks. Each of the blocks 10, 20, and 30 typically have an independent decode and input/output (I/O) circuits. For example, block 10 may have a decode circuitry 12 and I/O circuitry 13 that is 10 utilized for the entire memory block 10. That is, a common decode circuitry 12 and I/O circuitry 13 is typically utilized for the large memory block 10.

In integrated circuit designs of the prior art, a large rectangular block of memory, such as memory block 10, 20, or 30 of FIG. 1, typically comprises approximately 10 to 50 percent of the total memory implemented within the integrated circuit. Therefore, each block of memory typically provides a relatively large percentage of the total memory implemented in an integrated circuit. Also, because of the relatively large size and inflexible shape of prior art memory blocks, a relatively small number of blocks are typically implemented within an integrated circuit 100 of the prior art. For example, in prior art designs, typically no more than 10 memory blocks are implemented within an integrated circuit. Moreover, the memory blocks implemented in integrated circuits that comprise non-memory components are typically larger in size than most of the non-memory components implemented within such integrated circuit. For example, in a microprocessor chip 100, memory blocks 10, 20, and 30 are typically larger than most of the non-memory components contained within the CPU core 40, such as the ALU, floating point execution unit, etcetera.

Because the memory blocks 10, 20, and 30 of the prior art are typically implemented only as relatively large, rectangular blocks of memory, the organization of such memory within the chip 100 is very inflexible. For example, suppose in developing the core 40 for chip 100 a component, shown as component 42, needs to expand in size, thus requiring such component 42 to consume more surface space. For example, suppose that in designing component 42, it had to expand in size, in the manner illustrated in FIG. 1, in order to achieve its performance target. As shown in FIG. 1, it may be necessary for component 42 to expand such that it violates the boundary of rectangular cache block 10. Such a violation of cache block 10 is extremely problematic in prior art designs because it is very difficult to redesign prior art cache block 10 around the expanding component 42. For example, it is very difficult to redesign cache block 10 such that its upper, lefthand corner is cut out to make room for the expanding component 42. Therefore, such a redesign of cache block 10 would typically be very complex and time consuming, and therefore presents a large cost obstacle in designing the cache block 10 around the changing composition of the chip, as needed. For example, the large arrays of the prior art depend on their rectangular structure to share drivers and decoders.

Because of the great difficulty involved in redesigning such prior art cache block 10 to various shapes and sizes to respond to the changing composition of a chip (e.g., the expansion of component 42), designers typically respond to such changes in composition by moving (or relocating) an entire memory block within the chip. So, for example, in response to the changing size of component 42, which would otherwise violate the boundary of cache block 10, a designer of the prior art chip 100 would typically attempt to relocate the entire cache block 10 to a new location on chip 100. Often, such a relocation of the large, rectangular cache block 10 results in an undesirably large amount of white space (i.e., unused surface space of a chip) on the die. Additionally, sufficiently large blocks of space may not be available on the surface of chip 100 in which to relocate such a large rectangular block of cache. Thus, a smaller overall amount of cache memory may have to be implemented within chip 100 because sufficient large blocks of space are not available for implementing one or more of the large rectangular blocks 10, 20, and 30. For example, because the memory block 10 is likely much larger than the non-memory component 42, it is difficult to rearrange the memory block 10 around the expanding non-memory component 42 in a desirable manner (e.g., that does not result in a large amount of white space on the chip 100.) Therefore, organizing memory blocks within a chip of the prior art is typically a very difficult and complex task because of the inflexibility of the large, rectangular blocks commonly implemented in such prior art designs. That is, the large, rectangular blocks of memory typically implemented in prior art designs are very inflexible and result in great difficulty in reorganizing such memory blocks in response to changes in the composition of a chip.

In memory architecture of the prior art, memory blocks, such as blocks 10, 20, and 30 of FIG. 1, are commonly implemented with redundancy. For example, each memory block 10, 20, and 30, may each comprise smaller sub-blocks of memory therein. Also, each memory block 10, 20, and 30 may include a redundant sub-block therein, such as redundant sub-blocks 11, 21, and 31. It is common in manufacturing (or "fabricating") memory blocks within a chip that a defect may occur within a portion of a memory block. That is, a portion of a memory block may not allow for the proper storage and/or retrieval of data. Accordingly, redundant sub-blocks are typically implemented within such memory blocks, which can be used to effectively replace a defective sub-block of memory within the chip. For example, redundant sub-block 11 may be utilized to replace a defective sub-block of memory within the large memory block 10. Likewise, redundant sub-blocks 21 and 31 may each be utilized to replace defective sub-blocks within memory blocks 20 and 30, respectively.

Each sub-block of memory may typically be referred to as a "column" of memory. However, such a "column" of memory may actually comprise multiple columns and rows of memory cells. As shown in FIG. 1, a redundant sub-block (or column) is typically utilized to repair a defective column within a memory block. Accordingly, defective columns may be repaired by re-routing data from a defective column to the redundant column for a block of memory. However, in typical prior art designs implementing such column redundancy, defects that exist in "rows" of a memory block may not be repairable by a redundant column. Moreover, a redundant sub-block (e.g., redundant column) typically does not allow for repairing defects in the memory block's decoder circuitry or I/O circuitry. Thus, some defects that may occur within a memory block are not capable of being repaired with a redundant sub-block of a prior art design. Therefore, prior art redundancy implementations typically allow little flexibility in repairing defects of a memory block.

SUMMARY OF THE INVENTION

In view of the above, a desire exists for a memory architecture that provides flexibility in how the memory may be organized within an integrated circuit. That is, a desire exists for a memory architecture that provides sufficient flexibility to enable designers to easily organize the memory component of an integrated circuit around other components of the integrated circuit in a desirable manner. A further desire exists for a memory architecture that provides greater flexibility in repairing defects within the memory component of an integrated circuit. That is, a desire exists for a memory architecture that enables a greater number of defects to be repairable through redundancy within the memory component of an integrated circuit.

These and other objects, features and technical advantages are achieved by a system and method which implement a memory component of an integrated circuit as multiple, relatively small sub-arrays of memory. In a preferred embodiment, the memory component of an integrated circuit is implemented as multiple, relatively small sub-arrays of memory, which enable a designer great flexibility in arranging such sub-arrays within an integrated circuit. That is, the small sub-arrays of memory enable a designer to easily arrange the memory component of an integrated circuit around the non-memory components of such integrated circuit in a desirable manner. Thus, a designer may arrange the sub-arrays of memory around the non-memory components of an integrated circuit such that the non-memory components do not violate the boundary of the memory component. Further, a designer may arrange the sub-arrays of memory in a manner that minimizes the amount of white space on an integrated circuit. Alternatively, a designer may arrange the sub-arrays of memory in a manner that provides a desired amount of white space strategically positioned within an integrated circuit to provide margin around portions of the integrated circuit that have uncertain dimensions early in the design stages.

In a preferred embodiment, the memory component of an integrated circuit is implemented as multiple memory sub-arrays that are each independent. For example, in a preferred embodiment, each memory sub-array comprises its own decode circuitry for decoding memory addresses that are being requested to be accessed by an instruction, and each memory sub-array comprises its own I/O circuitry. Thus, in a preferred embodiment, each memory sub-array is physically and electrically independent of the other memory sub-arrays.

In one implementation of a preferred embodiment, each of the independent memory sub-arrays implemented in an integrated circuit comprises no more than approximately 5 percent of the total memory implemented on the integrated circuit. Most preferably, each of the independent memory sub-arrays implemented in an integrated circuit comprises approximately 1 percent of the total memory implemented on the integrated circuit. In another implementation of a preferred embodiment, each of the independent memory sub-arrays on an integrated circuit is no larger than approximately the average size of other non-memory components implemented on the integrated circuit. Therefore, in a preferred embodiment, each independent sub-array is relatively small in size to enable great flexibility in organizing the memory on an integrated circuit. Additionally, in a preferred embodiment, the memory component of an integrated circuit comprises at least 20 independent memory sub-arrays. More preferably, the memory component of an integrated circuit comprises at least 30 independent memory sub-arrays, and even more preferably, the memory component of an integrated circuit comprises at least 50 independent sub-arrays. Additionally, in a most preferred embodiment, the memory component of an integrated circuit comprises approximately 100 independent sub-arrays. In a most preferred embodiment, the integrated circuit comprises a processor and the memory component of the integrated circuit comprises a cache for the processor, and most preferably such memory component comprises at least 1 megabyte of cache memory for the processor.

As discussed above, in a preferred embodiment, the memory component of an integrated circuit is implemented as multiple, small sub-arrays, which enable great flexibility in organizing the memory component within an integrated circuit. As also discussed above, in a preferred embodiment, each sub-array is implemented as an independent, stand-alone array of memory. As a result, such independent sub-arrays of memory may be implemented as redundant sub-arrays that are capable of effectively repairing any defect within another sub-array. That is, redundant sub-arrays can be implemented within the memory component of an integrated circuit that are capable of replacing a defective sub-array (e.g., by rerouting data from the defective sub-array to the redundant sub-array). Because the entire defective sub-array is replaceable with a redundant sub-array, a preferred embodiment provides great flexibility in repairing any defect that is detected within a memory sub-array.

It should be appreciated that a technical advantage of one aspect of the present invention is that a flexible memory architecture is provided. Accordingly, a memory architecture of a preferred embodiment allows a designer great flexibility in organizing a memory component of an integrated circuit. For example, a memory architecture of a preferred embodiment allows a designer to readily respond to compositional changes within an integrated circuit by easily reorganizing the memory component of such integrated circuit. A further technical advantage of one aspect of the present invention is that the memory component of an integrated circuit may be organized in an optimum manner. For example, the memory component of an integrated circuit may be organized in a manner that minimizes the amount of white space within the integrated circuit (e.g., by arranging sub-arrays of memory on substantially all of the available white space of a chip). As another example, the memory component of an integrated may be organized in a manner that provides a desired amount of white space positioned strategically within the integrated circuit during the design phase. It should be recognized that in general, a designer's goal is to minimize the amount of white space present in an integrated circuit at the end of the design phase. However, during the design phase it may be helpful to budget white space within the integrated circuit to be used as margin when other components (e.g., the CPU core) within the circuit grow, as they often do throughout the actual design phase. Yet a further technical advantage of one aspect of the present invention is that great flexibility is available in repairing defects within the memory component of an integrated circuit. That is, because the entire defective sub-array is replaceable with a redundant sub-array in a preferred embodiment, such a preferred embodiment provides great flexibility in repairing any defect that is detected within a memory sub-array.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIGS. 3A and 3B show further exemplary implementations of a preferred embodiment, in which memory sub-arrays are organized around other components of a chip;

FIG. 4 shows a further exemplary implementation of a preferred embodiment, in which memory sub-arrays of varying sizes are utilized;

FIGS. 5A and 5B show further exemplary implementations of a preferred embodiment, in which sub-arrays are arranged to allow desired white space in strategic locations of a chip which may be utilized for expanding components and/or additional components.

DETAILED DESCRIPTION

Figure 2:
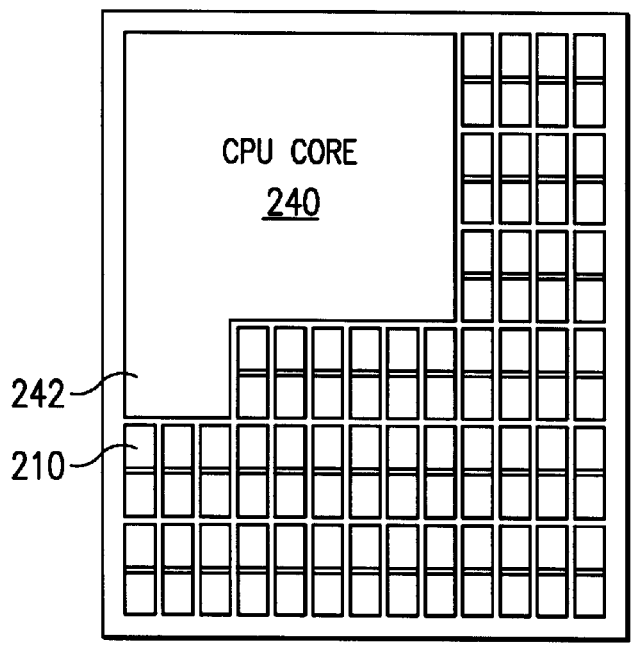
FIG. 2 shows an exemplary memory organization utilizing a preferred embodiment of the present invention.

Turning to FIG. 2, an exemplary memory organization utilizing a preferred embodiment of the present invention is shown. As shown, small sub-arrays of memory are implemented, rather than the large blocks of memory of the prior art. That is, the cache for a microprocessor chip 200 is implemented as multiple, relatively small sub-arrays, such as sub-array 210, rather than large memory blocks. In a most preferred embodiment, each sub-array (e.g., sub-array 210) is approximately 24 K bytes. More specifically, in a most preferred embodiment, sub-array 210 comprises 256 columns by 768 rows of memory cells. However, sub-array 210 may be implemented with any number of bytes and having any number of columns and rows that enable a designer sufficient flexibility in organizing the memory on the chip 200, and any such implementation is intended to be within the scope of the present invention.

In one implementation of a preferred embodiment, each of the independent memory sub-arrays implemented in an integrated circuit comprises no more than approximately 5 percent of the total memory implemented on the integrated circuit. Such an implementation enables a sufficiently small sub-array to allow a designer great flexibility in organizing the memory within an integrated circuit. In another implementation of a preferred embodiment, each of the independent memory sub-arrays of an integrated circuit is no larger than approximately the average size of other non-memory components implemented on the integrated circuit. For example, each of the independent memory sub-arrays of a microprocessor chip may be implemented having a size no larger than approximately the average size of non-memory components (e.g., other "functional" or "execution" units) of the microprocessor chip, such as the ALU, floating point execution unit, and other non-memory, functional components within the microprocessor chip. In a further implementation of a preferred embodiment, each of the independent memory sub-arrays of an integrated circuit is no larger than approximately the majority of the other non-memory, functional components of the integrated circuit. Because such implementations provide sub-arrays that are substantially the same size or smaller than the average number of other, non-memory components within the integrated circuit, the memory sub-arrays may be easily organized in a desired manner (e.g., a manner that results in very little white space in the integrated circuit). Therefore, in a preferred embodiment, each independent sub-array is relatively small in size to enable great flexibility in organizing the memory on an integrated circuit.

In one implementation of a preferred embodiment, each of the independent sub-arrays is implemented having dimensions that are no larger than 33 percent of the corresponding dimension size of a non-memory block of the integrated circuit. Even more preferably, each of the independent sub-arrays is implemented having dimensions that are no larger than 20 percent of the corresponding dimension size of a non-memory block of the integrated circuit, and even more preferably, each of the independent sub-arrays is implemented having dimensions that are no larger than 10 percent of the corresponding dimension size of a non-memory block of the integrated circuit. For example, in one implementation of a preferred embodiment, independent sub-arrays are implemented on a microprocessor chip having a CPU core (i.e., non-memory block), which may comprise multiple execution units therein (i.e., non-memory components). In one implementation of a preferred embodiment, the X-dimension of an independent sub-array is no larger than 33 percent of the X-dimension (or width) of the CPU core, and the Y-dimension (or length) of the independent sub-array is no larger than 33 percent of the Y-dimension of the CPU core. Because such implementation provide sub-arrays with dimensions that are substantially smaller than the dimensions of a non-memory block within the integrated circuit, the memory sub-arrays may be easily organized in a desired manner (e.g., a manner that results in very little white space in the integrated circuit). Therefore, in a preferred embodiment, each independent sub-array is relatively small in size to enable great flexibility in organizing the memory on an integrated circuit. Of course, in other implementations each sub-array may have dimensions of any size, and any such implementation is intended to be within the scope of the present invention.

Additionally, in a further implementation of a preferred embodiment, the memory component of an integrated circuit comprises at least 20 independent memory sub-arrays. By providing such a large number of independent memory sub-arrays, greater flexibility in arranging the total amount of memory to be implemented within an integrated circuit is achieved. In a most preferred embodiment, the integrated circuit comprises a processor and the memory component of the integrated circuit comprises a cache for the processor, and most preferably such memory component comprises at least 1 megabyte amount of cache memory for the processor. Although, the memory component may comprise any amount of cache memory for such a processor. Furthermore, the scope of the present invention is intended to encompass any type of integrated circuit that comprises a memory component, which may further comprise a non-memory component.

In a most preferred embodiment, each sub-array is a stand-alone memory array having its own decode circuitry, its own control generation, and its own I/O circuitry. Thus, in a most preferred embodiment, each one of the sub-arrays provides a fraction of the data bits being sent out to the data path 230. Generally, data path 230 is the block in which received data is first used by the processor. In a most preferred embodiment, a total of 134 sub-arrays are implemented. Additionally, in a most preferred embodiment, two wires of data are implemented for each sub-array. Thus, for example, 128 data sub-arrays may be implemented to provide 256 data bits, 5 error correction code (ECC) bits, sub-arrays may be implemented to provide 10 ECC data bits, and one redundant sub-array may be implemented to provide two redundancy data bits. Such 134 sub-arrays may be arranged on any available space of a chip (e.g., anywhere that the core and/or other components do not exist).

Figure 1:
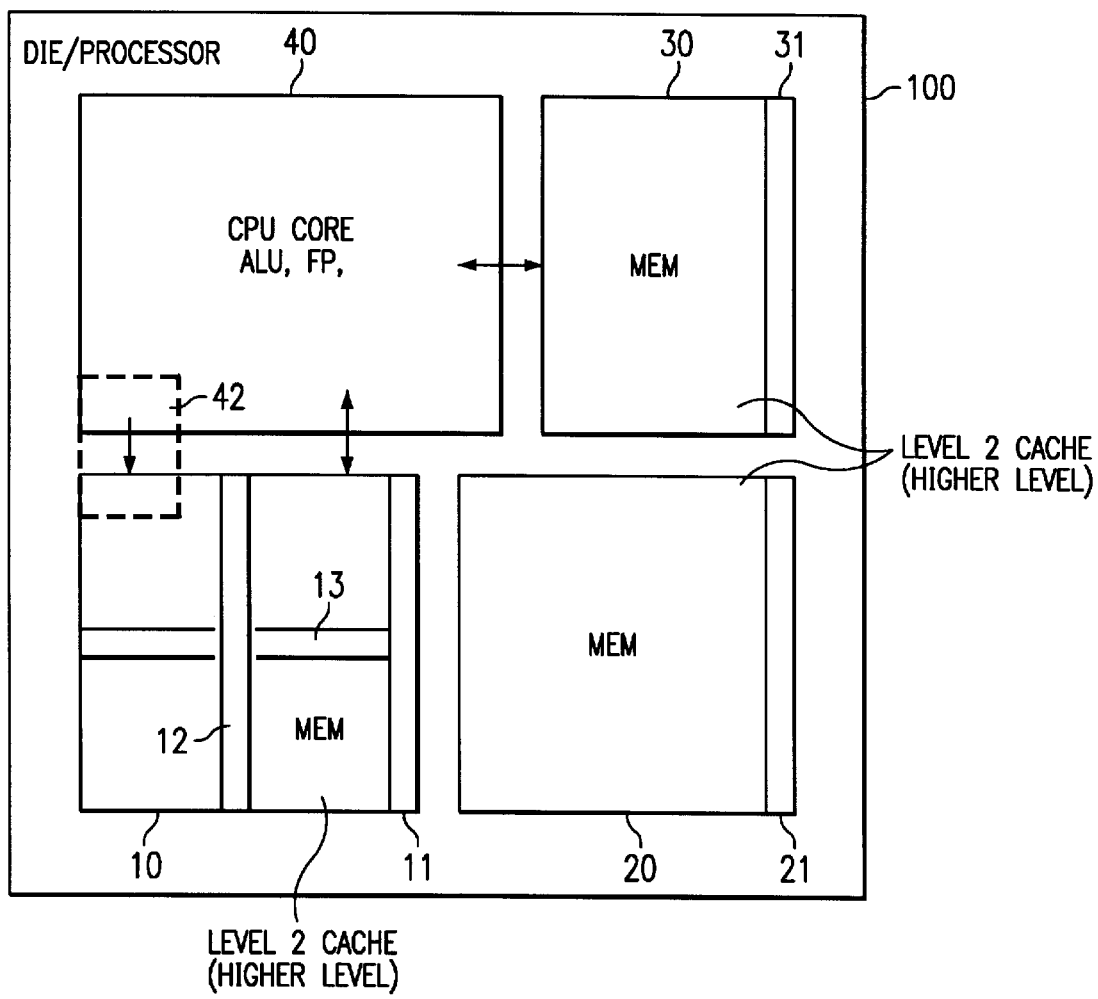
FIG. 1 shows a prior art implementation of large, rectangular blocks of memory within a chip design.

The sub-array implementation of a preferred embodiment provides a designer greater flexibility in organizing memory on a chip 200. For example, FIG. 2 illustrates an exemplary organization of the sub-arrays to respond to the expansion of component 242 of the core 240, which is similar to the composition change discussed above in conjunction with FIG. 1. As shown in the example of FIG. 2, the memory sub-arrays may be easily organized around the abnormally (or "irregularly") shaped core 240. Thus, the memory sub-arrays may allow a designer to make optimum use of available space on a chip in implementing memory on the chip. As will be discussed more fully hereafter, the memory sub-arrays of a preferred embodiment may allow a designer to organize the memory in a manner that minimizes the amount of white space on a chip. Also, the memory sub-arrays of a preferred embodiment may allow a designer to organize the memory in a manner that allows for a desirable amount of white space to be present in strategic locations of a chip. Furthermore, the memory sub-arrays of a preferred embodiment offer a designer great flexibility in arranging the memory in any manner deemed to be an optimum use of the available space on a chip.

Turning to FIG. 3A, a further exemplary implementation of a preferred embodiment is shown. As shown in FIG. 3A, chip 200 again comprises an irregularly shaped CPU core 240. For instance, component 261 causes a portion of the right side of core 240 to protrude outward. Additionally, other components have been implemented within chip 200, such as data path block 230 and control block 290. As shown in FIG. 3A, these additional components have been embedded in the midst of the cache sub-arrays. Also shown in FIG. 3A, are the bus interfaces 50, 52, 54, and 56, which are the main I/O circuitry for the chip 200. As shown in FIG. 3A, in a preferred embodiment, the memory sub-arrays (e.g., sub-array 210) allow a designer sufficient flexibility to implement such sub-arrays around the non-memory components (e.g., core 240, data path block 230, and control block 290), as desired.

In the exemplary implementation illustrated in FIG. 3A, the memory sub-arrays have been arranged to utilize the majority of the available surface space of chip 200. That is, the memory sub-arrays have been arranged for the most efficient utilization of the available surface area of chip 200. Once again, chip 200 comprises memory sub-array 210, as well as other memory sub-arrays (e.g., sub-array 220). In a preferred embodiment, each memory sub-array is independent comprising a mid-logic circuitry, such as mid-logic circuitry 258 of sub-array 210, which will be discussed in greater detail hereafter in conjunction with FIG. 6. Because the small sub-array implementation of a preferred embodiment is capable of being easily adapted to any die composition, a preferred embodiment provides a very flexible memory architecture.

As illustrated in FIG. 3A, a designer can basically position the memory sub-arrays (or "sub-blocks") in the white space around the various other components of a chip. It should be understood that in developing various components of a chip, such as the CPU core 240 of chip 200, such components may be required to be larger than initially anticipated. For instance, a team responsible for designing CPU core 240 to meet certain performance specifications may initially anticipate the resulting core 240 to be relatively small in size and have a rectangular shape. However, in actually implementing CPU core 240, it may result as a larger component and/or may have an irregular shape, thereby, causing its surrounding boundaries to change. Furthermore, a change in such a components size and/or shape may be recognized fairly late in the development stage of a chip. As a result, a flexible memory architecture that allows a designer to easily adapt the memory to compositional changes within a chip is very desirable. Thus, a preferred embodiment provides a memory structure that enables a designer great flexibility in adapting a memory organization in response to various size changes and/or boundary changes (e.g., size and shape changes) of components implemented within a chip.

Suppose, for example, that in designing component 262 within the core 240 it is determined that component 262 needs to expand in size (e.g., needs to grow outward to the right). As component 262 expands, sub-arrays 212 and 213 become at risk of having their boundaries violated. That is, expanding component 262 may violate the boundary established for sub-arrays 212 and 213. Accordingly, a chip designer would like to have the flexibility of easily re-arranging sub-arrays 212 and 213 to allow component 262 to grow as desired. As shown in FIG. 3A, available sites (i.e., available white space on the chip), such as the white space areas 270 of chip 200, may be utilized for relocating sub-arrays 212 and 213. Thus, the memory may be easily reorganized such that sub-arrays 212 and 213 are implemented in an available white space area, as shown in FIG. 3B, to allow a designer great flexibility in responding to compositional changes within chip 200 (e.g., component 262 expanding). As will be discussed in greater detail hereafter, available white space on a chip, such as white space 270, that is not otherwise used for relocating sub-arrays having their boundaries violated by expanding components may be utilized for implementing additional redundant sub-arrays, thereby increasing the amount of redundancy in the memory.

As another example of the flexibility of the memory of a preferred embodiment, suppose component 261 of core 240, shown in FIG. 3A, expands such that it violates the boundary of sub-arrays 214 and 215. In response, sub-arrays 214 and 215 may be relocated to another location within chip 200. For instance, sub-arrays 214 and 215 could be relocated to the white space 270. Obviously, there are some limits as to the amount of white space available in area 270. However, a designer can also change the size of the sub-array to make use of smaller white space areas. For instance, a designer may reduce the size of sub-array 214 and/or 215 and implement the resulting sub-array(s) in the small white space area 218. Thus, the size of a sub-array may be changed to allow a small area of white space to be utilized for such smaller sub-array. Changing the size of the sub-arrays in this manner is further illustrated in conjunction with FIGS. 4 and 5.

Turning now to FIG. 4, an example of reducing the size of sub-arrays of the cache to provide further flexibility in memory organization is shown. In FIG. 4, the size of each sub-array of the cache, such as sub-array 310, has been reduced to provide additional white space that is strategically positioned on chip 300. For instance, the additional white space 380 enables a greater margin between the bottom of the core 340 and the top of the cache during the design phase. In this case, sub-array 310 may now comprise 256 columns by 704 rows, for example. As further illustrated in FIG. 4, sub-arrays of varying sizes may be implemented for the cache. For example, as shown in FIG. 4, "half-height" sub-arrays 312, 314, 316, 318 and 320 are implemented to enable the cache memory to be organized in a desired manner. For example, each of such "half-height" sub-arrays may comprise 256 columns by 352 rows. In the exemplary implementation shown in FIG. 4, the size (e.g., the sub-arrays' height) of sub-arrays 312 and 314 is reduced to provide a desired amount of white space between the cache memory and the CPU core 340. Similarly, sub-arrays 318 and 320 have reduced size to provide a desired amount of white space between the cache memory and the data path 330 and control block 390, respectively. Additionally, sub-arrays 316 have reduced size to more fully utilize available space within chip 300. Furthermore, the implementation of FIG. 4 creates additional white space, such as white space 370, that could be utilized to implement additional redundant sub-arrays or to expand the size of the memory cache, if the designer so desired.

Figure 5A:
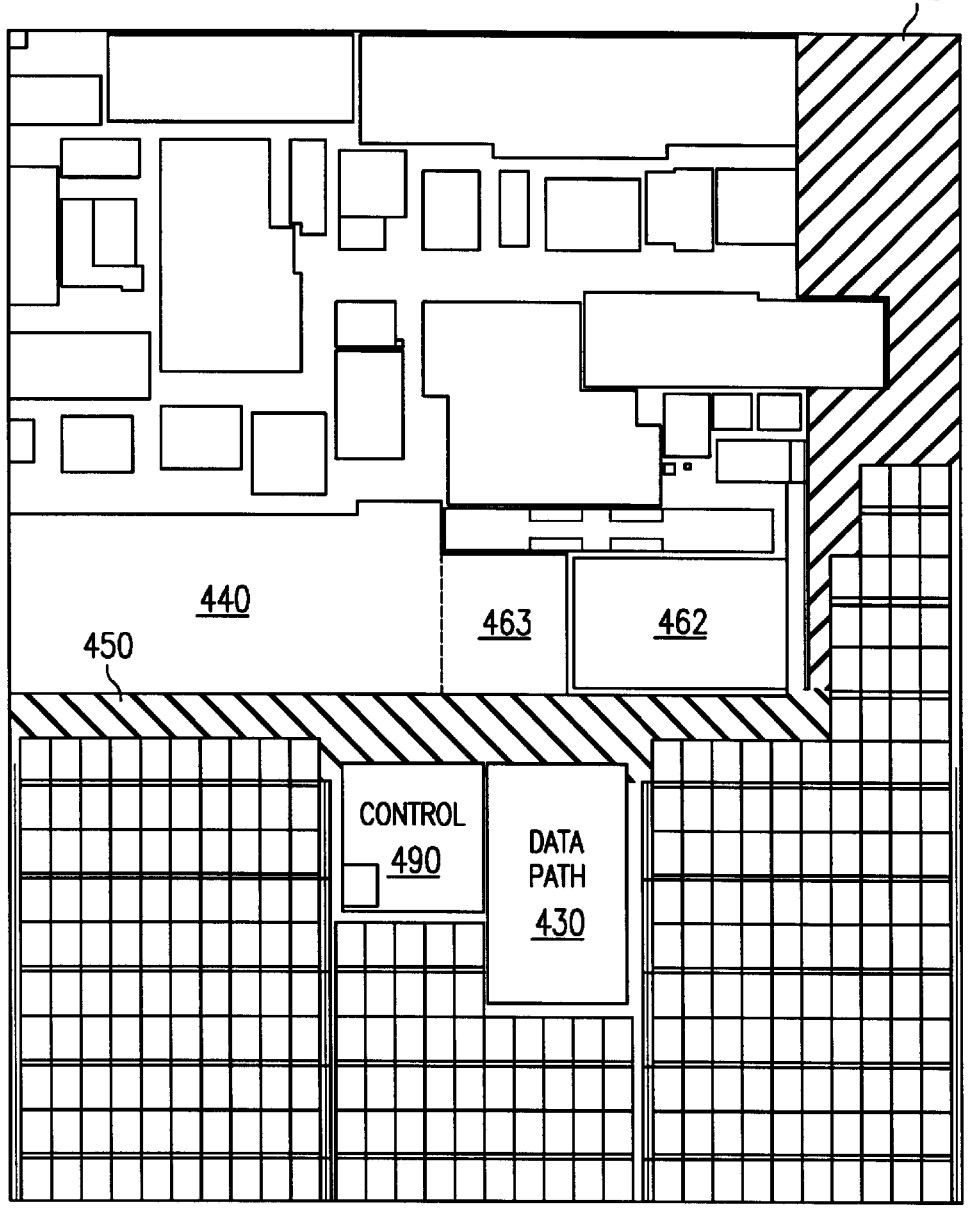

FIG. 5A illustrates a further example of an implementation for a chip 400 that comprises a CPU core 440, control block 490, data path 430, and cache sub-arrays. In the exemplary implementation of FIG. 5A, the overall amount of level 2 cache implemented is reduced. For example, the amount of level 2 cache implemented in the exemplary implementation of FIG. 5A may be 2½ megabytes (MB), as opposed to the 3 MB implemented in a most preferred embodiment of FIG. 3A. In this implementation, each sub-array is the same size, but the overall amount of cache implemented is reduced, thereby enabling a desired amount of white space to be available on the chip 400. Thus, in the implementation of FIG. 5A, each sub-array is implemented having the same size, and the sub-arrays are sufficiently small to enable a desired amount of white space to be available on the chip 400. The sub-arrays are arranged in a manner that allows for white space to be strategically located on the chip 400. For example, the sub-arrays are organized in a manner that allows for white space 450 to be strategically positioned below the CPU core 440, and white space 452 to be strategically positioned to the side of CPU core 440.

Accordingly, the overall amount of memory implemented may be reduced, and because such memory is implemented as multiple sub-arrays, such reduced amount of memory may be organized in a manner that actually increases the amount of white space on a chip. Having a particular amount of white space on a chip may be desirable for several reasons. For example, a designer may desire to have a particular amount of white space available on a chip to allow for slight size modifications in components during the development of chip 400 and/or placing additional functional blocks in the chip 400 without requiring a reorganization of the memory sub-arrays. For instance, in developing chip 400 components within the core 440 may need to expand in size in order to offer a desired performance, and having white space strategically positioned around the core 400 may allow for such components to expand without violating the cache's boundary. Thus, the white space 450 and 452 may be used by the core (or other components) in developing chip 400, or if such white space is not required for the core (or other components), such white space may be utilized for additional sub-arrays or may allow for the size of the die to be reduced.

Accordingly, as shown in FIG. 5A, the sub-arrays are organized in a manner that allows for white space to be strategically available in the areas surrounding the core 440, which allows for core 440 to expand to such white space without requiring a reorganization of the memory sub-arrays. FIG. 5B shows an example where components 462 and 463 of FIG. 5A have increased in size due to growth in circuit areas or additional features added therein. Furthermore, additional functional components 471, 472, 473, and 474 have been added to the design in FIG. 5A, thereby utilizing the white space 452 available in FIG. 5A. Thus, the sub-array implementation of a preferred embodiment allows flexibility to make optimum use of available white space in that a designer may maximize the use of such white space for memory sub-arrays or a designer may arrange the memory sub-arrays in a manner that allows for white space to be available in strategic areas of a chip.

Figure 6:
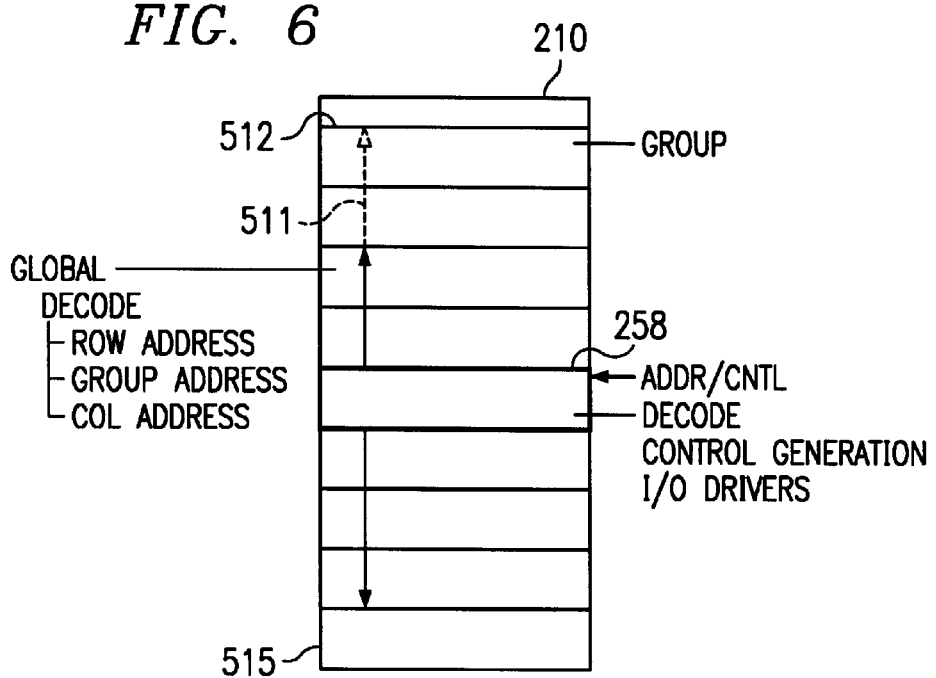
FIG. 6 shows an independent memory sub-array of a preferred embodiment of the present invention.

Turning to FIG. 6, a sub-array of a preferred embodiment is shown in greater detail. As shown, in a preferred embodiment, sub-array 210 comprises midlogic 258, which includes address and control decode, as well as control generation and I/O drivers for sub-array 210. In a most preferred embodiment, two output drivers and two input receivers are implemented for a sub-array 210. Above and below the midlogic 258 are groups of memory cells, such as group 515. In a most preferred embodiment, each group comprises 256 columns by 96 rows of memory cells, for a total of 24 K-bytes of data in each group. However, in alternative embodiments, each group may be implemented in any manner and have any size, and any such embodiment is intended to be within the scope of the present invention. In the midlogic area 258, global control signals 511 are generated, which may be a global row address or a group address for one of the groups (e.g., a group address for group 515), and it also comprises a column address that can be used for selecting between some of the data that gets returned from a group back to the midlogic 258 to be output to the data path block.

Once the global control signal 511 gets out to each group, a final level of decode is utilized to generate a particular row line to be accessed (e.g., row line 512 of FIG. 6). In a preferred embodiment, an independent piece of metal is utilized for driving the row select for the RAM sub-array 210. Once a desired row of a group is accessed, data is returned from the group back to the midlogic 258 for a read operation or data is written to the group for a write operation. Thus, in a preferred embodiment, each sub-array is a completely stand-alone memory array (i.e., an "independent" memory array) having its own decode circuitry and I/O circuitry. In a preferred embodiment, each sub-array is implemented in a similar manner as discussed for sub-array 210 of FIG. 6, such that each sub-array is an independent sub-array that is physically and electrically isolated from the other memory sub-arrays implemented within a chip. It should be understood that sub-array 210 may be implemented in any number of ways. Accordingly, the scope of the present invention is not intended to be limited solely to the preferred implementation discussed with FIG. 6, but instead the scope of the present invention is intended to encompass any implementation of a sub-array 210. It should be recognized, however, that most preferably each sub-array (e.g., sub-array 210) is implemented as an independent sub-array.

Because the sub-arrays of a preferred embodiment are independent sub-arrays, greater flexibility is available in repairing defects within the memory. That is, an entire sub-array may be utilized to provide redundancy for another sub-array. Accordingly, if a defect occurs within a portion of the memory of a sub-array (e.g., the memory is not operating to store and/or retrieve data correctly), such defect can be repaired by rerouting data from the defective sub-array to a redundant sub-array. Moreover, such a redundant sub-array is capable of repairing other defects, which redundant memory blocks of the prior art are typically unable to repair. That is, column redundancy typically implemented in the prior art (e.g., as discussed with FIG. 1) has some limitations as to the kind of defects that can be repaired. However, in a preferred embodiment, each of the sub-arrays is completely independent electrically and physically, and therefore can be utilized to repair any defect within another sub-array. Thus, for example, if a defect (e.g., an electrical short) occurs on word line 512, it can be repaired by utilizing a redundant sub-array. However, prior art redundancy schemes are typically unable to repair such a defect. As another example, if we have a defect (e.g., an electrical short) on one of the global decode signals, it can be repaired by utilizing a redundant sub-array, whereas such a defect is typically not repairable in prior art redundancy schemes. Furthermore, if a defect occurs in the I/O driver (or elsewhere in the midlogic 258), such a defect is repairable because the entire sub-array is completely replaceable by a redundant sub-array.

Thus, because each sub-array is completely independent, a redundant sub-array may be utilized to replace an entire sub-array, thereby effectively repairing any defect that may be present in the sub-array. In a preferred embodiment, all of the redundancy multiplexing required for mapping out the defective sub-arrays (i.e., to reroute data from a defective sub-array to a redundant sub-array) is implemented within the data path block. As a result, none of the redundancy overhead is required to be implemented in the sub-arrays, but is rather implemented in a common place (i.e., in the data path block). Therefore, in a preferred embodiment, the sub-arrays are very efficient and any type of defect detected within a sub-array may be repaired with a redundant sub-array.

In view of the above, in one implementation of a preferred embodiment, multiple independent memory sub-arrays are implemented on an integrated circuit such that each sub-array comprises no more than 5 percent of the total memory of such integrated circuit. However, the scope of the present invention is not intended to be limited solely to such an implementation. Also, in one implementation of a preferred embodiment, multiple independent sub-arrays are implemented on an integrated circuit such that each sub-array is no larger than the approximate size of a majority of the non-memory (or "functional" or "execution") components of the integrated circuit. In a further implementation of a preferred embodiment, multiple independent sub-arrays are implemented on an integrated circuit such that each sub-array is no larger than approximately the size of the average of the non-memory components of the integrated circuit. However, the scope of the present invention is not intended to be limited solely to such implementations. In still a further implementation of a preferred embodiment, at least 20 independent memory sub-arrays are included within an integrated circuit. However, the scope of the present invention is not intended to be limited solely to such implementation.

It should be understood that in a most preferred embodiment, each independent memory sub-array comprises approximately 24 K bytes. However, the scope of the present invention is not intended to be limited solely to an independent sub-array having a size of approximately 24 K bytes, but rather any number of bytes may be included within a memory sub-array of the present invention. Furthermore, in a most preferred embodiment, an independent memory sub-array comprises 256 columns by 768 rows. However, the scope of the present invention is not intended to be limited solely to an independent sub-array having 256 columns by 768 rows, but rather any number of columns and rows may be included within a memory sub-array of the present invention. It should be further understood that the exemplary implementations described in conjunction with the FIGS. provided herein are intended only as examples, which render the disclosure enabling for many other implementations. Accordingly, the specific dimensions, sizes, and any other specific numerical/ quantitative references provided in the above description with regard to a memory sub-array of the present invention are intended solely as examples and are not intended to limit the scope of the present invention beyond the limitations recited in the appended claims.

Furthermore, it should be understood that the independent sub-array memory architecture of a preferred embodiment is most preferably implemented for cache on a microprocessor chip. However, it should also be understood that the independent sub-array memory architecture of a preferred embodiment may be implemented for any type of chip comprising memory therein. Furthermore, it should be understood that the independent memory sub-array architecture of a preferred embodiment may be implemented within any type of computer system having a processor, including but not limited to a personal computer (PC), laptop computer, and personal data assistant (e.g., a palmtop PC).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of implementing a flexible memory architecture within an integrated circuit, said method comprising:
   establishing at least 20 independent sub-arrays of memory within an integrated circuit, wherein each of said independent sub-arrays of memory includes its own decode circuitry for decoding a requested address and its own I/O circuitry;
   establishing at least one of said independent sub-arrays of memory as a redundant sub-array of memory, wherein said at least one redundant sub-array of memory is usable to effectively repair a defect within at least one other of said independent sub-arrays of memory; and
   distributing said independent sub-arrays around a core of said integrated circuit that comprises an irregularly shaped boundary, wherein said independent sub-arrays are distributed about said irregularly shaped boundary of said core in a manner that manages white space present on said integrated circuit in a desired manner.

2. The method of claim 1 wherein each of said independent sub-arrays have dimensions that are no larger in size than 33 percent of the corresponding dimensions of said core of said integrated circuit.

3. The method of claim 2 wherein said core is a CPU core.

4. The method of claim 1 wherein each of said independent sub-arrays of memory is no larger than approximately the average size of individual functional units included in said core of said integrated circuit.

5. The method of claim 1 wherein each of said independent sub-arrays of memory is physically arid electrically independent of every other one of said independent sub-arrays of memory.

6. The method of claim 1 further including the step of:
   routing data from a defective independent sub-array of memory to said redundant sub-array of memory in order to effectively repair said defective independent sub-array of memory.

7. The method of claim 6 wherein said routing data step enables repairing at least one defect selected from the group consisting of: memory cell defect, decode circuitry defect, and input/output circuitry defect.

8. An integrated circuit comprising:
   a core comprising a plurality of non-memory components; and
   a memory component that is implemented as multiple independent memory sub-arrays that are each no larger in size than approximately the average size of said plurality of non-memory components, wherein said multiple independent memory sub-arrays form a memory array having an irregularly shaped boundary.

9. The integrated circuit of claim 8 wherein each of said independent memory sub-arrays includes no more than approximately five percent of said memory component.

10. The integrated circuit of claim 8 wherein said multiple independent memory sub-arrays are organized within said integrated circuit in a manner that minimizes the amount of white space in said integrated circuit.

11. The integrated circuit of claim 8 wherein said plurality of non-memory components include at least one execution unit of a processor, and wherein said memory component includes cache for said processor.

12. A computer system comprising:
   a core that comprises a processor that executes instructions, said core comprising a width and a length; and
   a cache structure accessible by said processor to satisfy memory access requests, wherein said cache structure includes multiple independent sub-arrays of memory that each includes no more than five percent of said cache structure and that each are no wider than 33 percent of said width of said core and are no longer than 33 percent of said length of said core, wherein said multiple independent sub-arrays of memory form a memory array having an irregularly shaped boundary.

13. The computer system of claim 12 further including an integrated circuit that includes said processor and said cache structure, wherein each of said independent sub-arrays of memory comprises no more than five percent of said cache structure of said integrated circuit.

14. The integrated circuit of claim 8 wherein each of said multiple independent memory sub-arrays includes its own decode circuitry for decoding a requested address and its own I/O circuitry.

15. The computer system of claim 12 wherein each of said multiple independent sub-arrays of memory includes its own decode circuitry for decoding a requested address and its own I/O circuitry.

16. The method of claim 1 wherein said sub-arrays are distributed to form a memory array having an irregularly shaped boundary.

17. The method of claim 16 wherein said memory array comprises at least one row of sub-arrays that has more sub-arrays than at least one other row.

18. The method of claim 16 wherein said memory array comprises at least one column of sub-arrays that has more sub-arrays than at least one other column.

* * * * *